United States Patent
Mikhaylenko

(10) Patent No.: US 7,296,948 B2
(45) Date of Patent: Nov. 20, 2007

(54) FLOOR MUD FORMING DEVICE AND METHODOLOGY

(76) Inventor: Vadim Mikhaylenko, 3909 Sunbeam Rd., Apt. 512, Jacksonville, FL (US) 32257

(*) Notice: Subject to any disclaimer, the term of this patent is extended or adjusted under 35 U.S.C. 154(b) by 0 days.

(21) Appl. No.: 11/277,874

(22) Filed: Mar. 29, 2006

(65) Prior Publication Data
US 2006/0222459 A1 Oct. 5, 2006

Related U.S. Application Data

(60) Provisional application No. 60/666,651, filed on Mar. 29, 2005.

(51) Int. Cl.
*E01C 15/18* (2006.01)
(52) U.S. Cl. ............ 404/118; 15/235.4
(58) Field of Classification Search ........ 15/235.4, 15/235.6, 235.8; 404/96, 112, 118
See application file for complete search history.

(56) References Cited

U.S. PATENT DOCUMENTS

| | | | | |
|---|---|---|---|---|
| 2,468,981 A | * | 5/1949 | Huffman | 404/112 |
| 2,836,056 A | * | 5/1958 | Drummond | 404/112 |
| 2,860,506 A | * | 11/1958 | Drummond | 404/112 |
| 2,910,923 A | * | 11/1959 | Thieme et al. | 404/112 |
| 3,683,761 A | * | 8/1972 | Babic | 404/112 |
| 4,198,178 A | * | 4/1980 | Carlstrom et al. | 404/112 |
| 4,784,519 A | * | 11/1988 | Artzberger | 404/112 |
| 4,848,959 A | * | 7/1989 | Morrison | 404/112 |
| 4,859,115 A | * | 8/1989 | Morrison | 404/112 |
| 6,264,397 B1 | * | 7/2001 | Majewski | 404/112 |
| 7,104,725 B1 | * | 9/2006 | Kipp et al. | 404/112 |

* cited by examiner

*Primary Examiner*—Gary S Hartmann
(74) *Attorney, Agent, or Firm*—Mark Young, P. A.

(57) ABSTRACT

A device for preparing a sloped mud surface around a drain prior to setting tile or stone includes one or more arms (i.e., rigid arms) attached to a sleeve and rotatably supported relative to a vertical axis defined by a vertical shaft and horizontal planar base. An adjustable clamp assembly releasably secures the device to a conventional drain, which may be secured to a drainpipe by pipe threads. The bottom edge of the arm provides a straight working edge. The arm can be freely moved (i.e., rotated) around the vertical shaft degrees, counterclockwise and clockwise. As the arm rotates around the vertical shaft the working edge sweeps over the floor mud surface, spreading and leveling the surface while scraping or sweeping away excess material.

18 Claims, 8 Drawing Sheets

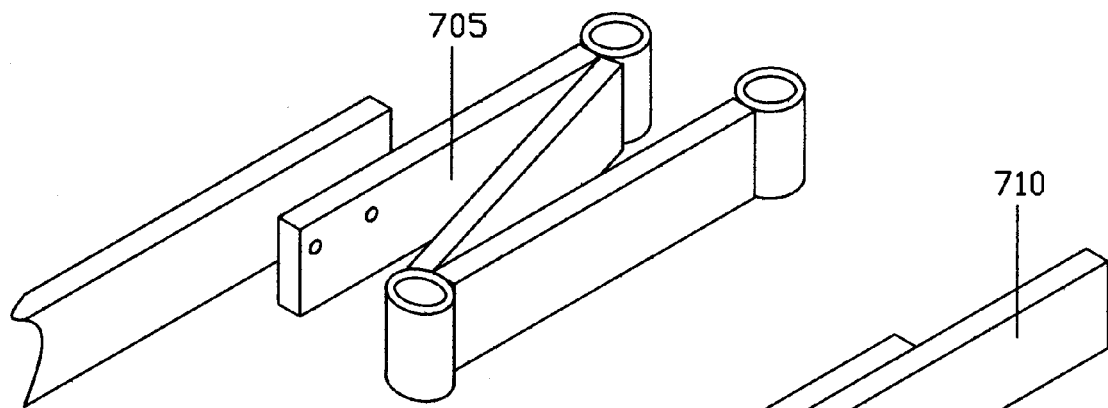
FIGURE 7A
FIGURE 7B
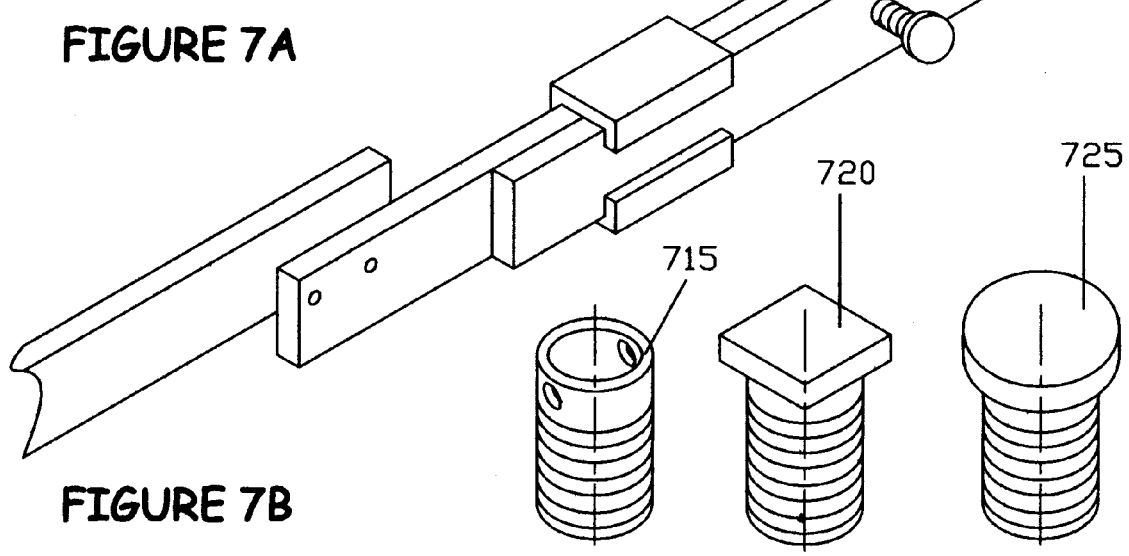
FIGURE 7C
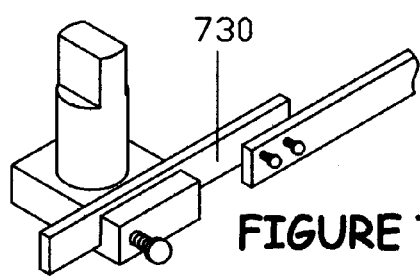
FIGURE 7D
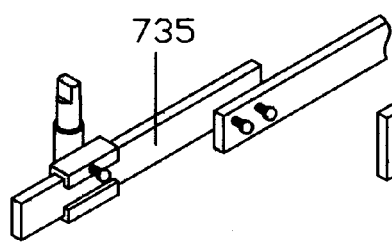
FIGURE 7E
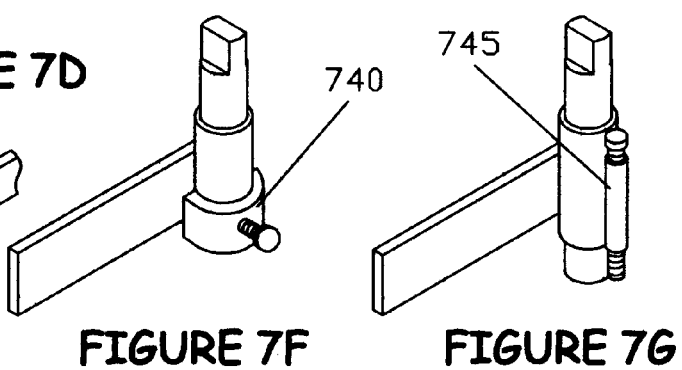
FIGURE 7F    FIGURE 7G

FLOOR MUD FORMING DEVICE AND METHODOLOGY

RELATED APPLICATION

This application claims the benefit of priority of U.S. Provisional Application 60/666,651, filed Mar. 29, 2005, the entire contents of which are incorporated herein.

FIELD OF THE INVENTION

This invention relates generally to masonry tools, and, more particularly, to tools and methods for preparing a sloped mud surface around a drain prior to setting tile or stone.

BACKGROUND

An important aspect of setting ceramic tile and stone around a drain is the process of applying "floor mud." Floor mud is typically comprised of Portland Cement, sand and water mixed together to a semi-dry condition. The floor mud provides a surface upon which ceramic tile or stone may be set. The floor mud surface is referred to herein as the surface of floor mud, floor mud surface, or mud surface.

Proper construction of a floor surface with a drain into which water is to be collected presents a common challenge in building construction. Such a floor surface should be smoothly graded across its extent with sufficient and consistent inclination to facilitate water collection at the drain, while preventing unwanted pooling of water in other areas of the floor surface. Concomitantly, unduly steep and non-uniform inclinations should be avoided for aesthetic, comfort and safety reasons.

Meeting these objectives using conventional construction methods requires experience, diligence and attention to detail. Unfortunately, conventional methods of constructing such floor surfaces are time consuming, laborious and conducive to error. Typically, improvised solutions with tools that are not designed or particularly well suited for the process are utilized. In many cases, the end-products exhibit inconsistent, inferior and unacceptable properties. In such cases, the unacceptable floor mud must be removed and the process must be repeated, resulting in great loss of time, money, goodwill and possibly employment.

A device and method to facilitate properly, efficiently and consistently applying floor mud to achieve the desired inclination is urgently needed. The invention is directed to fulfilling one or more of the needs and overcoming one or more of the problems as set forth above.

SUMMARY OF THE INVENTION

To overcome one or more of the problems as set forth above, in one aspect of the invention, a device for preparing a sloped mud surface around a drain prior to setting tile or stone is provided. An exemplary device according to principles of the invention includes one or more arms (i.e., rigid arms) attached to a sleeve and rotatably supported relative to a vertical axis defined by a vertical shaft and horizontal planar base. An adjustable clamp assembly releasably secures the device to a conventional drain, which may be secured to a drainpipe by pipe threads. The bottom edge of the arm provides a straight working edge. The arm can be freely moved (i.e., rotated) around the vertical shaft degrees, counterclockwise and clockwise. As the arm rotates around the vertical shaft the working edge sweeps over the floor mud surface, spreading and leveling the surface while scraping or sweeping away excess material.

The sleeve and arm are rigidly attached to each other at a desired angle. The working edge of the arm is fixed at a desired acute angle a relative to the horizon, which is an important aspect for consistently creating a uniform inclined mud surface. The acute angle formed between the working edge of the arm and the horizontal base defines the incline of the floor mud surface.

The base provides a planar substrate to hold the shaft and clamping assembly and stabilize the device in a desired position relative to a drain and the vertical and horizontal axes. The vertical shaft is securely attached to the base and extends perpendicularly from the horizontal planar base thereby defining a vertical axis around which the arm may rotate. The vertical shaft and drain are concentric when the clamping assembly engages (i.e., grips) the drain.

The adjustable clamp assembly is comprised of stationary supports and an adjustable support is provided on the bottom of the base. The stationary supports are positioned to contact the periphery of one half of a drain. The adjustable support is positioned to controllably exert force against the periphery of the opposite half of the drain.

Also provided is an exemplary method of operation, which entails attaching the device to a drain; ensuring the device is level; spreading floor mud; installing and adjusting arm sections; rotating the arm; and progressively lowering the elevation of the arm and repeating rotation of the arm to achieve a desired uniform inclined surface. In operation, the clamping assembly is positioned over the exposed surface of a drain with the stationary supports contacting the periphery of one half of a drain. The adjustable support is then adjusted to exert force against the periphery of the opposite half of the drain. Rotation of the knob causes corresponding rotation of the threaded actuator in the threaded aperture of the clamping support which results in linear advancement of the clamping head towards the stationary supports. The operator may then install an arm comprised of one or more sections. Spacers or other height adjustments may be utilized to ensure that the arm rests at an elevation where the working surface meets the applied floor mud. Then, the operator may rotate the arm around the shaft, either manually or employing a motorized drive. After each one or more complete rotation of the arm, the arm may be lowered such as by removing one or more spacers until the working edge comes in contact with the floor mud surface. Then, the operator may rotate the arm around the shaft again. The steps of rotation and lowering may be repeated until the bottom of the sleeve reaches the surface of the base (or any other limit defining a bottom position). Upon completion of the foregoing steps, the mud surface should exhibit the desired characteristics of a determined, uniform, consistent inclination from the drain.

BRIEF DESCRIPTION OF THE DRAWINGS

The foregoing and other aspects, objects, features and advantages of the invention will become better understood with reference to the following description, appended claims, and accompanying drawings, where:

FIG. 7A provides a perspective view of an exemplary leveling arm assembly of a floor mud leveling device according to principles of the invention; and FIG. 7B provides a perspective view of an exemplary leveling arm assembly of a floor mud leveling device according to principles of the invention; and FIG. 7C provides a perspective view of exemplary hardware for a leveling arm assembly of a floor mud leveling device according to principles of the invention; and FIG. 7D provides a perspective view of an exemplary leveling arm assembly of a floor mud leveling device according to principles of the invention; and FIG. 7E provides a perspective view of an exemplary leveling arm assembly of a floor mud leveling device according to principles of the invention; and FIG. 7F provides a perspective view of an exemplary leveling arm sleeve of a floor mud leveling device according to principles of the invention; and FIG. 7G provides a perspective view of an exemplary leveling arm sleeve of a floor mud leveling device according to principles of the invention.

Figure 1:
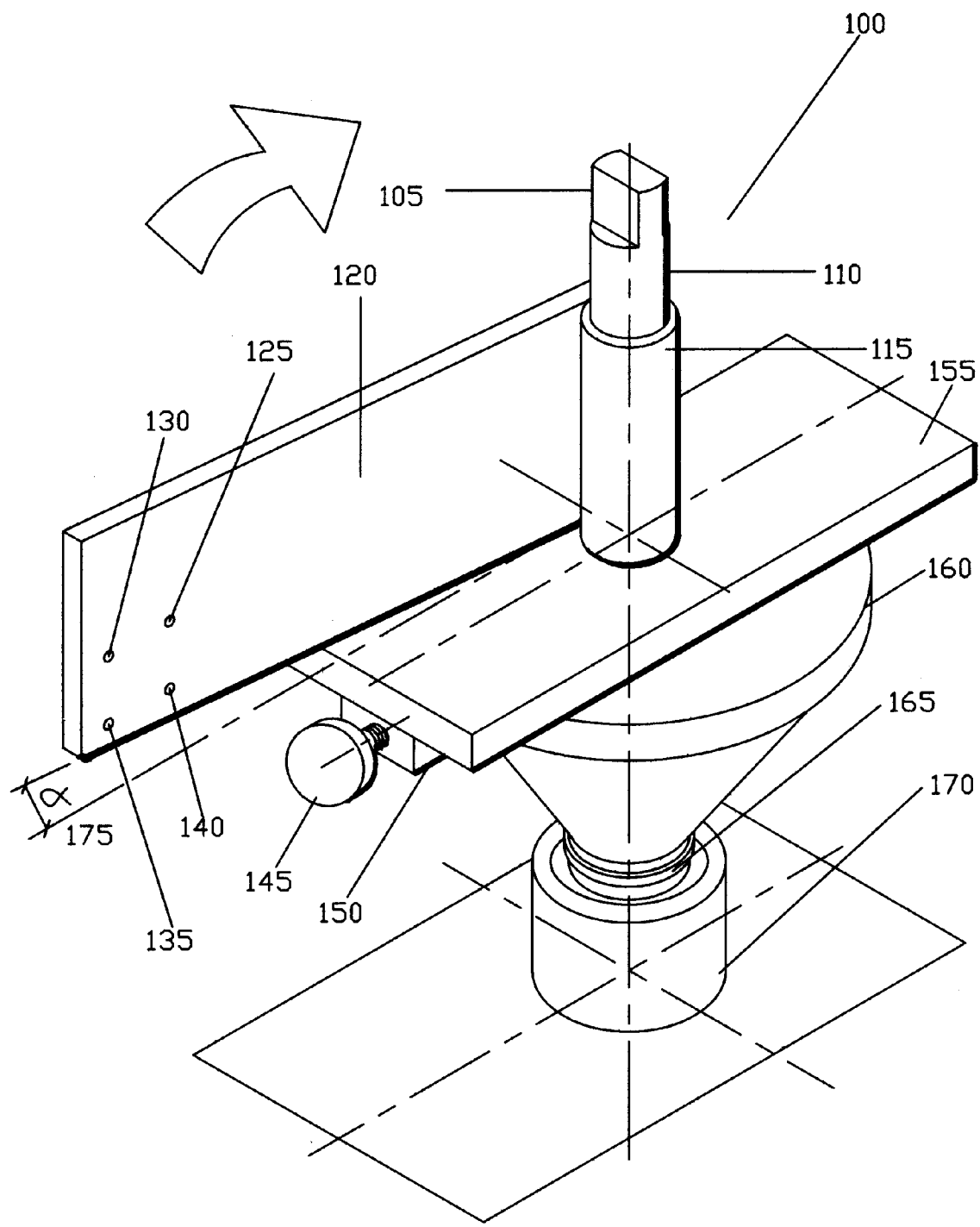
FIG. 1 provides a perspective view of an exemplary floor mud leveling device according to principles of the invention.

Those skilled in the art will appreciate that the invention is not limited to the exemplary embodiments depicted in the figures or the shapes, relative sizes, proportions or materials shown in the figures.

DETAILED DESCRIPTION

With reference to the drawings, wherein like numerals represent like features, an exemplary device to facilitate properly, efficiently and consistently applying floor mud to achieve a consistent, uniform and properly inclined floor mud surface according to principles of the invention are conceptually shown. Referring to the top perspective view of FIG. 1, the device 100 includes one or more arms 120 (i.e., rigid arms) attached to a sleeve 115 and rotatably supported relative to a vertical axis defined by a vertical shaft 110 and horizontal planar base 155. An adjustable clamp assembly (discussed below) releasably secures the device 100 to a conventional drain 160, which may be secured to a drainpipe 170 by pipe threads 165. The bottom edge of the arm 120 provides a atraight working edge. The arm 120 can be freely moved (i.e., rotated) around the vertical shaft 115, 360 degrees, counterclockwise and clockwise. As the arm 120 rotates around the vertical shaft 115, the working edge sweeps over the floor mud surface, spreading and leveling the surface while scraping or sweeping away excess material.

The sleeve 115 and arm 120 are rigidly attached to each other at a desired angle. During proper use, the sleeve 115 is maintained in a vertical position on the shaft 110. Consequently, the working edge of the arm is fixed at a desired acute angle α relative to the horizon. This fixed angle of the working edge is an important aspect for consistently creating a uniform inclined mud surface. The acute angle formed between the working edge of the arm 120 and the horizontal base 155 defines the incline of the floor mud surface.

The base 155 provides a substrate to hold the shaft 110 and clamping assembly (described below). The clamp assembly stabilizes the device in a desired position relative to a drain and the vertical and horizontal axes. The exemplary base 155 is a planar structure having an adequate size to support the shaft and clamping assembly, and adequate rigidity and strength to maintain integrity of the device 100 during use. The base 155 has means for attaching the shaft 110 and clamping assembly components. Such means may include a plurality of threaded apertures in corresponding positions. For example, a threaded aperture 320 is provided to hold the shaft 110. Threads of the threaded aperture 320 match threads on the shaft 110. Likewise, threaded apertures 325, 330 are provided to hold the stationary supports 205, 210, and threaded apertures 345, 350 are provided to hold the clamping support 150 to the base 155 using a plurality of screws 305, 310.

Figure 3:
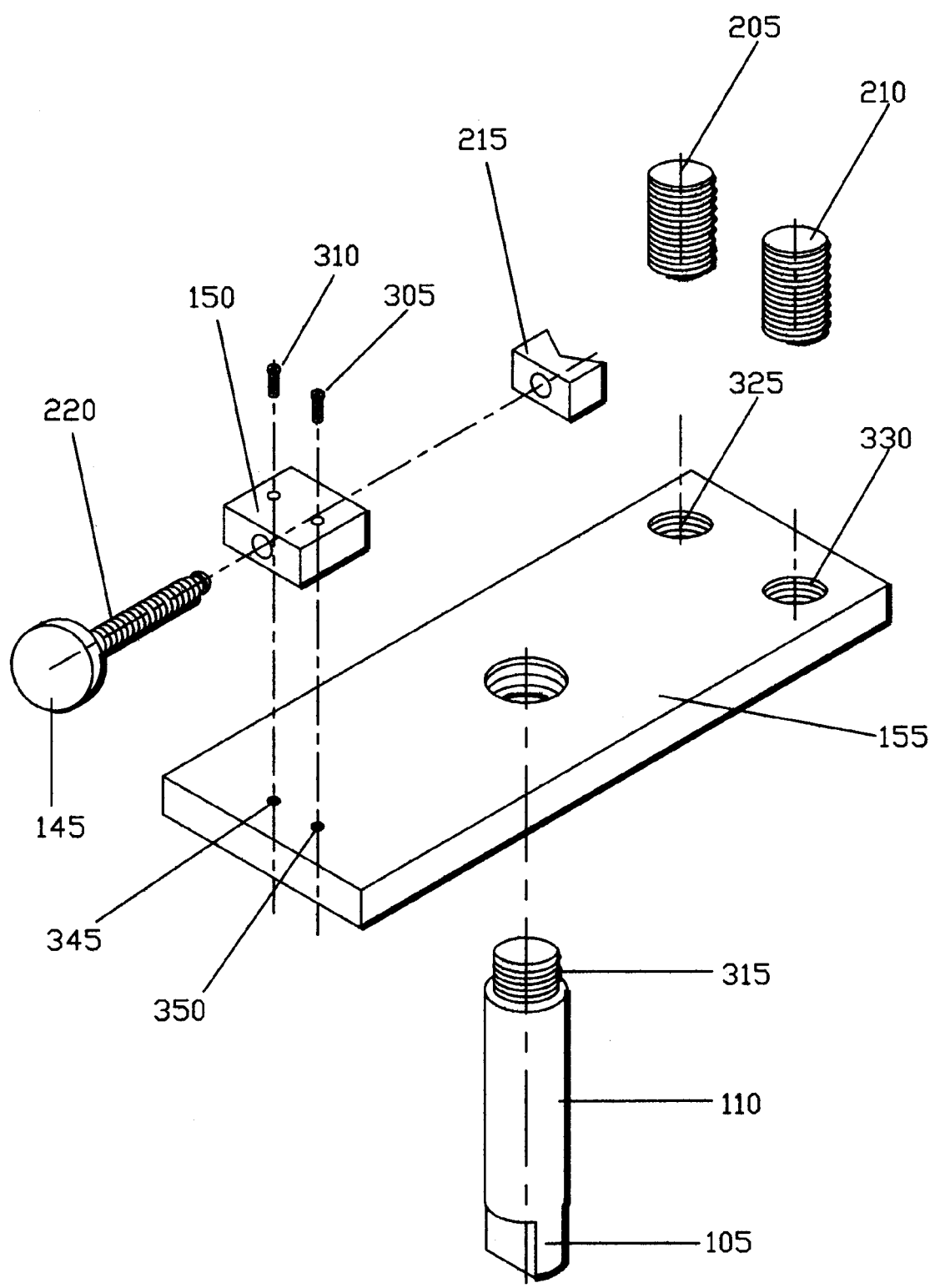
FIG. 3 provides an exploded view of an exemplary base, clamp and shaft assembly of a floor mud leveling device according to principles of the invention.

The vertical shaft 110 is securely attached to the base 155. The shaft 110 extends perpendicularly from the horizontal planar base 155, thereby defining a vertical axis around which the arm 120 may rotate. The vertical shaft 110 and drain 160 should be concentric, when the clamping assembly engages (i.e., grips) the drain. The shaft 120 is preferably removably mechanically attached to the base, such as by threaded engagement. Referring to FIG. 3, a threaded male proximal end 315 of the shaft 110 is received by a correspondingly threaded female aperture 320 in the base 155. The distal free end 105 of the shaft preferably tapers to a somewhat rectangular cross sectional shape to facilitate installation and removal using a conventional wrench, socket, pliers or the like.

Figure 2:
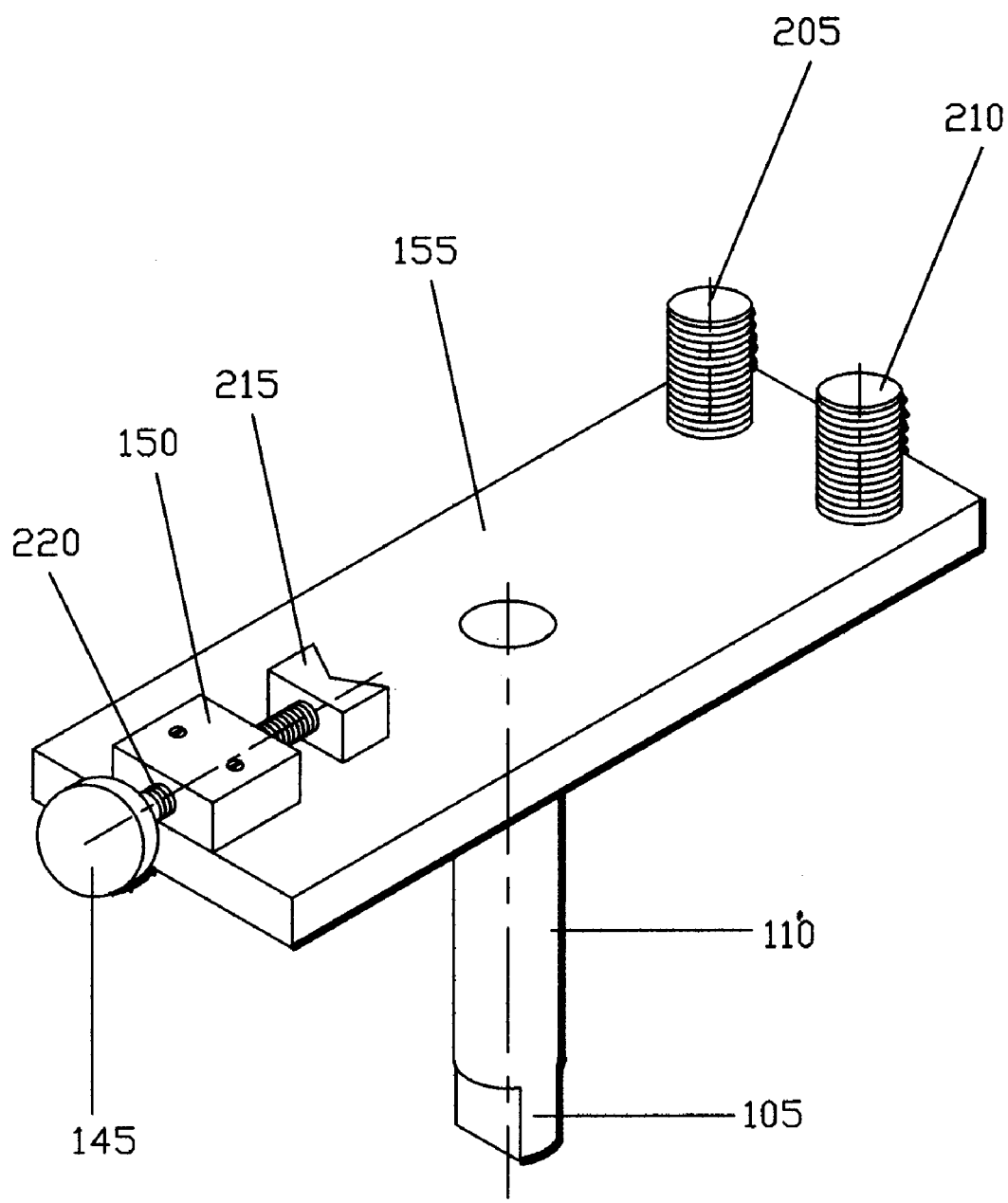
FIG. 2 provides a bottom perspective view of an exemplary base, clamp and shaft assemblies of a floor mud leveling device according to principles of the invention.

An adjustable clamp assembly is provided to releasably secure the device 100 to a drain 160. As shown in FIGS. 2 and 3, in an exemplary implementation, a clamp assembly comprised of stationary supports 205, 210 and an adjustable support 145, 150, 215, 220 is provided on the bottom of the base 155. The stationary supports 205, 210 are positioned to contact the periphery of one half of a drain 160. The adjustable support 145, 150, 215, 220 is positioned to controllably exert force against the periphery of the opposite half of the drain 160. By way of example and not limitation, the stationary supports may be comprised of threaded posts 205, 210, received in correspondingly threaded female apertures 325, 330 in the base 155. Illustratively, the adjustable support 145, 150, 215, 220 is comprised of a clamping head 215 adapted to contact and exert force against the periphery of a drain; a clamping support 150 affixed to the base by a plurality of screws 305, 310; and a threaded actuator 220 with a knob 145 to facilitate turning at the proximal end, and a free end adapted for rotatable attachment to the clamping head 215 at the distal end. The threaded actuator 220 is threadedly passed through a threaded aperture in the clamping support 150, with the distal end of the actuator 220 engaging the clamping head 215 on the drain side of the clamping support 150. Rotation of the knob 145, causes corresponding rotation of the threaded actuator 220 in the threaded aperture of the clamping support 220, which results in linear advancement of the clamping head 215 towards the stationary supports 205, 210, or linear movement of the clamping head 215 away from the stationary supports 205, 210, depending upon the direction of rotation and threading.

Advantageously, the device 100 can be configured to accommodate various size drains. The length of the actuator 220 determines the range of clamping motion. The length of the actuator 220 in combination with the position of the clamping support 150 relative to the stationary supports 205, 210 on the base 155, determines the size range of drains that the device can be configured to accommodate.

In operation, the clamping assembly is positioned over the exposed surface of a drain 160, with the stationary supports 205, 210 contacting the periphery of one half of a drain 160. The adjustable support 145, 150, 215, 220 is then adjusted to exert force against the periphery of the opposite half of the drain 160. Rotation of the knob 145, causes corresponding rotation of the threaded actuator 220 in the threaded aperture of the clamping support 220, which results in linear advancement of the clamping head 215 towards the stationary supports 205, 210, or linear movement of the clamping head 215 away from the stationary supports 205, 210, depending upon the direction of rotation and threading. Thus, the clamping assembly facilitates tightening for secure attachment to a drain 160 and loosening for removal therefrom.

Figure 4:
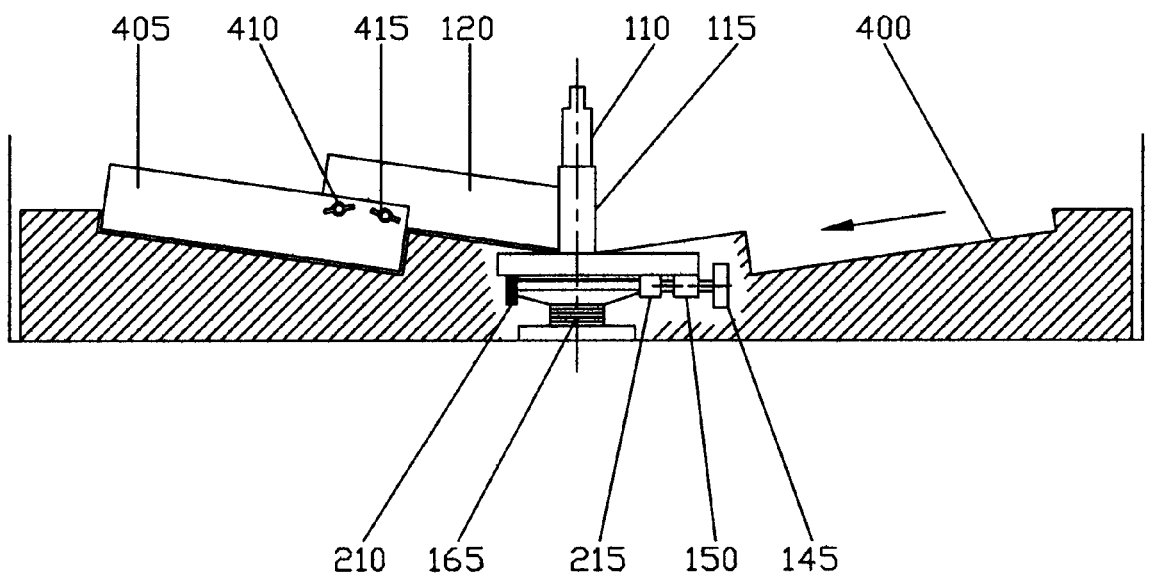
FIG. 4 provides a side sectional view of floor mud applied with an exemplary floor mud leveling device according to principles of the invention.

Referring now to FIG. 4, a side sectional view of floor mud 400 applied with an exemplary floor mud leveling device 100 according to principles of the invention is conceptually illustrated. The clamping assembly is positioned over the exposed surface of a drain 160, with the stationary supports 205, 210 contacting the periphery of one half of a drain 160. The adjustable support 145, 150, 215, 220 is adjusted to exert force against the periphery of the opposite half of the drain 160, securing the device 100 in place on the drain. Preferably the base 155 is level when the clamping assembly is secured in place, so that the shaft 110 is vertical. Optionally, the base 155may include a level indicator (e.g., a tube of liquid with a bubble configured to indicate horizontal when the bubble is centered) to facilitate determining when the base 155 is horizontal.

Figure 5:
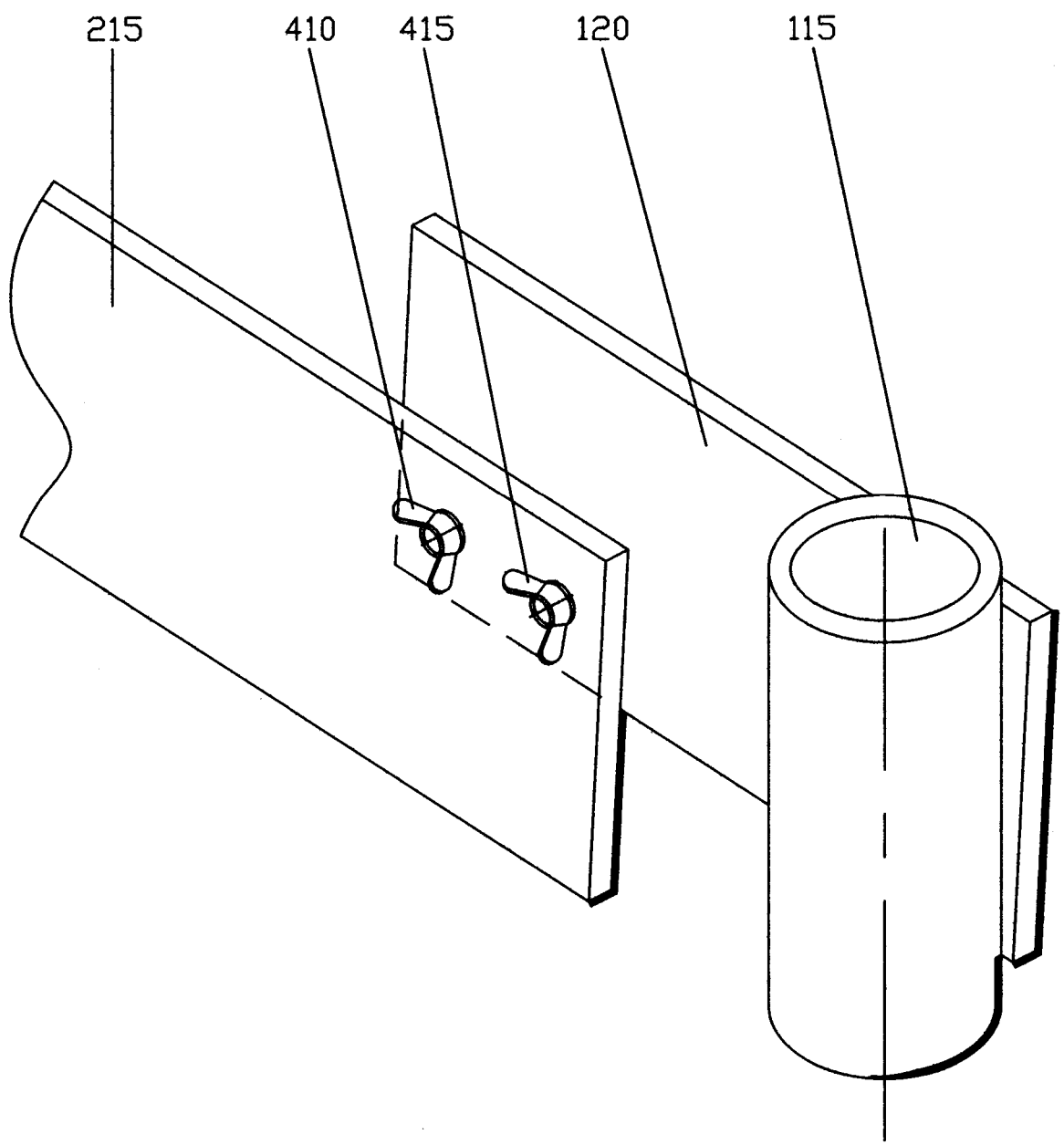
FIG. 5 provides a perspective view of an exemplary leveling arm assembly of a floor mud leveling device according to principles of the invention.

The exemplary arm is comprised of a plurality of sections, including a distal section 405 and a proximal section 120, adjoined together by mechanical fasteners 410, 415, as illustrated in FIG. 5. Referring again to FIG. 4, the distal section of the arm 405 forms a uniformly inclined surface of floor mud 400 into which tiles or stones will be set. The proximal section 120 of the arm forms a uniformly inclined surface of floor mud surrounding the drain 160. The closer the distal end 405 is positioned relative to the shaft 110, the smaller the area of floor mud 400 formed by the proximal section 120 of the arm. The vertical offset between the proximal and distal sections defines the recess formed in the floor mud 400.

Figure 6:
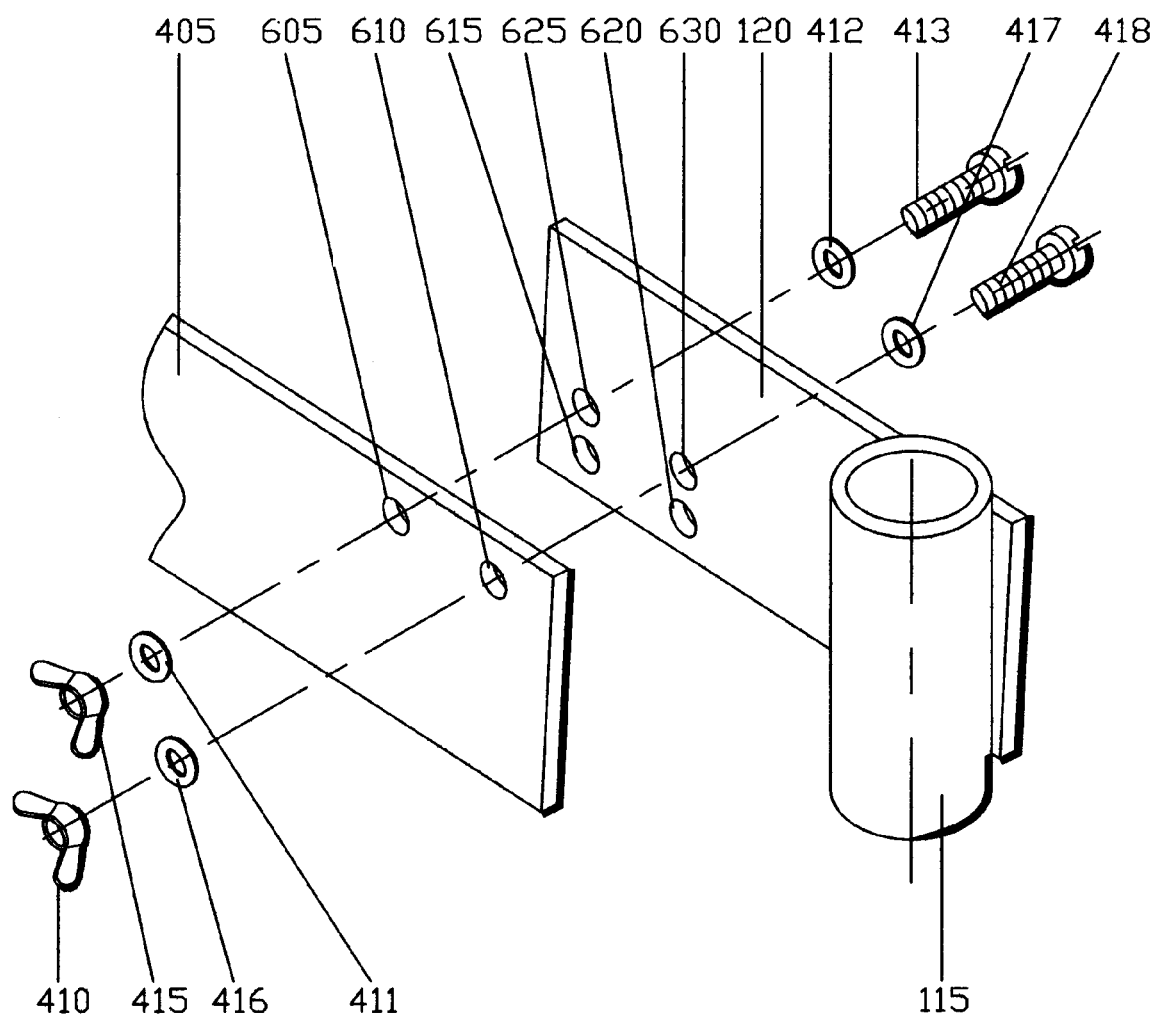
FIG. 6 provides an exploded view of an exemplary leveling arm assembly of a floor mud leveling device according to principles of the invention.

Referring now to FIG. 6, an exploded view of an exemplary leveling arm assembly of a floor mud leveling device according to principles of the invention is conceptually shown. Mechanical fasteners comprising wing nuts 410, 415, washers 411, 412, 416, 417 and bolts 413, 418 are provided to secure the distal section 405 to the proximal section 120. A plurality of holes 605, 610 are provided in the distal section for receiving the bolts 413, 418. Similarly, a plurality of holes are provided in the proximal section 120 for receiving the bolts at a first elevation 625, 630, or for receiving the bolts at a second elevation 615, 620. Thus, the elevation of the working edge of the distal section 405 may readily be adjusted to accommodate particular tile, stone and preferences. Nevertheless, the invention is not limited to a proximal section 120 with holes configured for a first elevation and a second elevation. Those skilled in the art will appreciate that one or more sets of holes may be provided in the proximal section 120 for receiving the bolts, and providing one or more elevations.

Referring now to FIGS. 7A, 7B, 7D and 7E, a plurality of adjustable arm configurations are shown. An arm may be comprised of hinged sections 705 adapted to be selectively unfolded to achieve a desired overall length, as shown in FIG. 7A. Alternatively, an arm may be comprised of one or more slidably extendible sections 710, 730, 735 adapted to be selectively extended to achieve a desired overall length, as shown in FIGS. 7B, 7D, 7E. One or more mechanical fasteners, such as a threaded bolt 715, 720, 725 screwed through a sleeve surrounding the slidable section in whole or in part, may be provided to lock the slidable arm into position, as illustrated in FIG. 7C.

Referring again to the top perspective view of FIG. 1, the device 100 includes one or more arms 120 attached to a sleeve 115 and rotatably supported relative to a vertical axis defined by a vertical shaft 110 and horizontal planar base 155. The sleeve 115 rotatably receives the shaft 110. The lengthwise central axis of the sleeve 115 is aligned with the central vertical axis of the shaft 110. The sleeve 115 may be freely moved up and down along the shaft 110. The sleeve 115 may also freely rotate 360 degrees around the shaft 110. The inner diameter of the sleeve is only slightly larger than the outer diameter of the shaft 110. Although the fit should be loose enough to allow free rotation, it should be tight enough to preclude errant movement (e.g., wobbling) of the arm that could result in an appreciably inconsistent or non-uniform inclination.

To allow greater height adjustment, the device may be equipped with adjustable sleeves. By way of example and not limitation, as shown in FIG. 7F, an outer sleeve 740 may be provided to engage an inner sleeve that rests on the base 155. In such an embodiment, the outer sleeve 740 may engage the inner sleeve at any vertical position along the length of the inner sleeve by tightening a bolt against the inner sleeve. In another embodiment, a parallel secondary sleeve 745 may be attached to the primary sleeve 115, as conceptually shown in FIG. 7G. A threaded support bolt that extends through the secondary sleeve 745 may be adjusted to support the primary sleeve 115 at a desired elevation on the shaft 110.

Figures 8A, 8B:
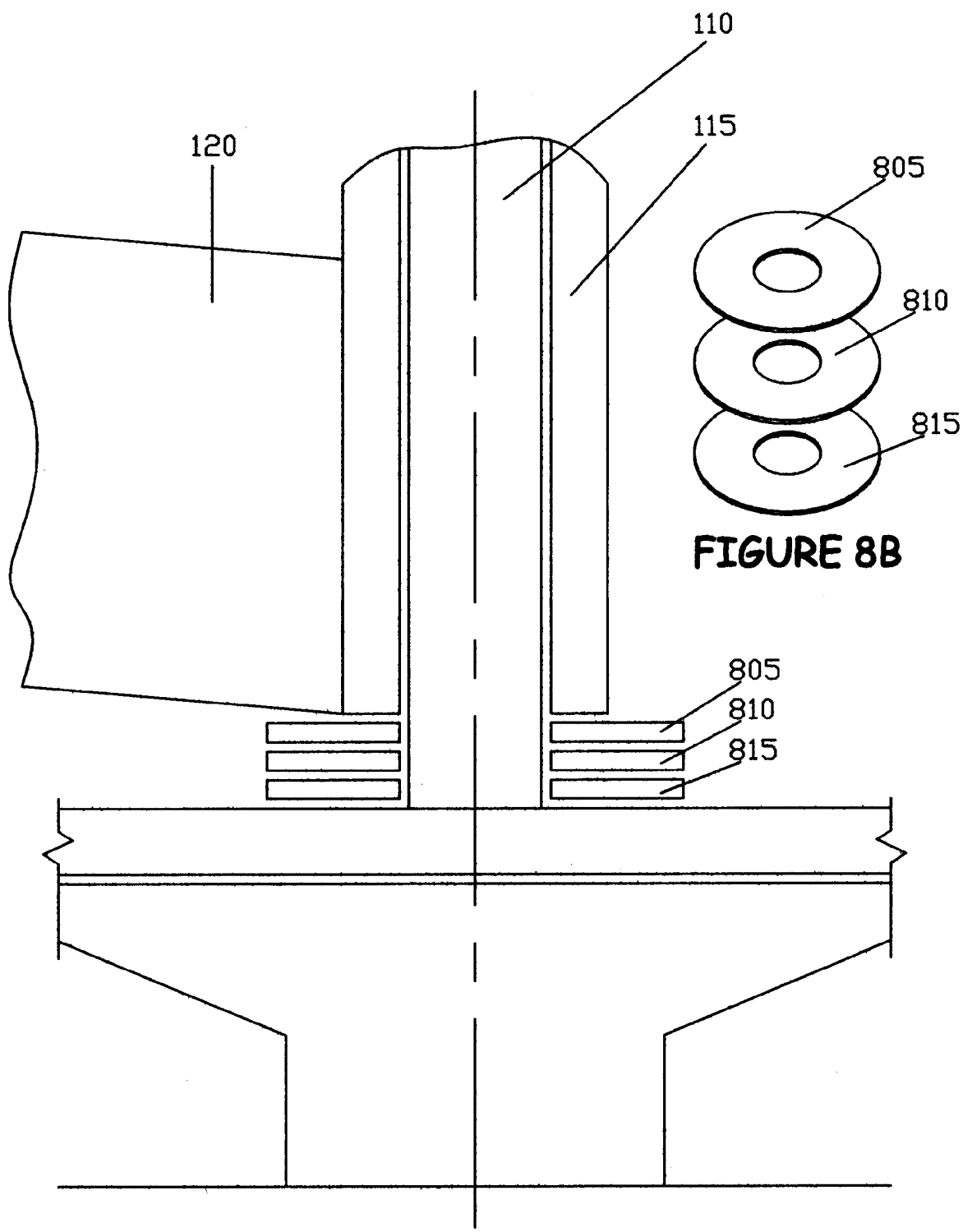
FIG. 8A provides a side sectional view of an exemplary leveling arm with a plurality of spacers supporting floor mud leveling device according to principles of the invention.
FIG. 8B provides a perspective view of a plurality of spacers for supporting floor mud leveling device according to principles of the invention.

Another means for height adjustment is a spacer. Referring to FIG. 8A, one or more spacers 805, 810, 815 may be positioned on the shaft 110, between the base 155 and sleeve 115, thereby elevating the sleeve 115 and attached arm 120. The spacers 805, 810, 815 may be comprised of washers or other suitable spacing devices, as illustrated in FIG. 8B.

An exemplary method of operation entails attaching the device to a drain; ensuring the device is level; spreading floor mud; installing and adjusting arm sections; rotating the arm; and progressively lowering the elevation of the arm and repeating rotation of the arm to achieve a desired uniform inclined surface. In operation, the clamping assembly is positioned over the exposed surface of a drain 160, with the stationary supports 205, 210 contacting the periphery of one half of a drain 160. The adjustable support 145, 150, 215, 220 is then adjusted to exert force against the periphery of the opposite half of the drain 160. Rotation of the knob 145, causes corresponding rotation of the threaded actuator 220 in the threaded aperture of the clamping support 220, which results in linear advancement of the clamping head 215 towards the stationary supports 205, 210. A leveling device (e.g., a spirit level) may be used and adjustments may be made to ensure that the base 155 is horizontal. Subsequently floor mud is spread around the device. The operator may then install an arm comprised of one or more sections. Spacers or other height adjustments may be utilized to ensure that the arm rests at an elevation where the working surface meets the applied floor mud. Then, the operator may rotate the arm around the shaft, either manually or employing a motorized drive. After each one or more complete rotation of the arm, the arm may be lowered such as by removing one or more spacers until the working edge comes in contact with the floor mud surface. Then, the operator may rotate the arm around the shaft again. The steps of rotation and lowering may be repeated until the bottom of the sleeve reaches the surface of the base (or any other limit defining a bottom position). Upon completion of the foregoing steps, the mud surface should exhibit the desired characteristics of a determined, uniform, consistent inclination from the drain.

While an exemplary embodiment of the invention has been described, it should be apparent that modifications and variations thereto are possible, all of which fall within the true spirit and scope of the invention. With respect to the above description then, it is to be realized that the optimum relationships for the components of the invention and steps of the process, including variations in form, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A floor mud surface forming device comprising:
a vertical shaft adapted to be secured perpendicular to a horizontal plane and concentric with a drain in a floor; and
an arm rotatably mounted to the shaft, said arm including a bottom working edge, said working edge forming an acute angle relative to the horizontal plane and being adapted for positioning proximate to a floor mud surface;
wherein the arm rotatably mounted to the shaft comprises a sleeve adapted to rotatably engage the vertical shaft and a first arm section operably coupled to said sleeve, said first arm section including the bottom working edge forming an acute angle relative to the horizontal plane and being adapted for positioning proximate to a floor mud surface.

2. A floor mud surface forming device according to claim 1, further comprising a planar base, said planar base having a top side and a bottom side, said vertical shaft being attached to and perpendicular to the planar base.

3. A floor mud surface forming device according to claim 2, further comprising a clamping assembly attached to the bottom of the planar base, said clamping assembly being configured to controllably grip a drain and position the vertical shaft concentric with the drain.

4. A floor mud surface forming device according to claim 3, said clamping assembly comprising a pair of stationary supports and an adjustable support, said stationary supports being positioned to contact a periphery of a half of a drain and said adjustable support being positioned to controllably exert force against the periphery of an opposite half of the drain.

5. A floor mud surface forming device according to claim 4, said adjustable support comprising a clamping head adapted to contact and exert force against the periphery of a drain; a clamping support affixed to the base; and a threaded actuator with proximal end and a distal end, said distal end being adapted for rotatable attachment to the clamping head.

6. A floor mud surface forming device according to claim 1, wherein the arm further comprises a second arm section mechanically fastened to and parallel to the first arm section.

7. A floor mud surface forming device according to claim 1, wherein the arm further comprises a second arm section mechanically adjustably fastened to and parallel to the first arm section.

8. A floor mud surface forming device according to claim 1, wherein the arm further comprises a second arm section hingedly connected to and parallel to the first arm section.

9. A floor mud surface forming device according to claim 1, wherein the arm further comprises a second arm section slidably coupled to and parallel to the first arm section.

10. A floor mud surface forming device according to claim 1, wherein the first arm section is slidably coupled to the sleeve.

11. A floor mud surface forming device according to claim 1, wherein the sleeve includes an inner sleeve and an outer sleeve adjustably attached to said inner sleeve.

12. A floor mud surface forming device according to claim 1, wherein the sleeve includes a primary sleeve and a parallel secondary sleeve attached to the primary sleeve, said parallel secondary sleeve including a threaded support bolt extending through the secondary sleeve and adjustable to support the secondary sleeve and attached primary sleeve at a determined elevation on the shaft.

13. A floor mud surface forming device according to claim 1, further comprising a planar base, said planar base having a top side and a bottom side, said vertical shaft being attached to and perpendicular to the planar base, and at least one spacer positioned on the shaft, between the base and sleeve, thereby elevating the sleeve and attached arm.

14. A floor mud surface forming device comprising:
a vertical shaft adapted to be secured perpendicular to a horizontal plane and concentric with a drain in a floor, wherein the vertical shaft includes a threaded end and a tapered end having a rectangular cross section; and
an arm rotatably mounted to the shaft, said arm including a bottom working edge, said working edge forming an acute angle relative to the horizontal plane and being adapted for positioning proximate to a floor mud surface, and the arm comprising a sleeve adapted to rotatably engage the vertical shaft and a first arm section operably coupled to said sleeve, said first arm section including the bottom working edge forming an acute angle relative to the horizontal plane and being adapted for positioning proximate to a floor mud surface; and
a planar base, said planar base having a top side and a bottom side, said vertical shaft being attached to and perpendicular to the planar base; and
a clamping assembly attached to the bottom of the planar base, said clamping assembly being configured to controllably grip a drain and position the vertical shaft concentric with the drain, said clamping assembly comprising a pair of stationary supports and an adjustable support, said stationary supports being positioned to contact a periphery of a half of a drain and said adjustable support being positioned to controllably exert force against the periphery of an opposite half of the drain.

15. A floor mud surface forming device according to claim 14, wherein the arm further comprises a second arm section from the group consisting of:

- a second arm section mechanically fastened to and parallel to the first arm section; and
- a second arm section mechanically adjustably fastened to and parallel to the first arm section; and
- a second arm section hingedly connected to and parallel to the first arm section; and
- a second arm section slidably coupled to and parallel to the first arm section.

16. A floor mud surface forming device according to claim 15, wherein the sleeve comprises a sleeve assembly from the group consisting of:

- an inner sleeve and an outer sleeve adjustably attached to said inner sleeve; and
- a primary sleeve and a parallel secondary sleeve attached to the primary sleeve, said parallel secondary sleeve including a threaded support bolt extending through the secondary sleeve and adjustable to support the secondary sleeve and attached primary sleeve at a determined elevation on the shaft.

17. A floor mud surface forming device according to claim 16, further comprising a at least one spacer positioned on the shaft, between the base and sleeve, thereby elevating the sleeve and attached arm.

18. A method of forming a floor mud surface using a floor mud surface forming device, said device comprising:

- a vertical shaft adapted to be secured perpendicular to a horizontal plane and concentric with a drain in a floor, wherein the vertical shaft includes a threaded end and a tapered end having a rectangular cross section; and
- an arm rotatably mounted to the shaft, said arm including a bottom working edge, said working edge forming an acute angle relative to the horizontal plane and being adapted for positioning proximate to a floor mud surface, and the arm comprising a sleeve adapted to rotatably engage the vertical shaft and a first arm section operably coupled to said sleeve, said first arm section including the bottom working edge forming an acute angle relative to the horizontal plane and being adapted for positioning proximate to a floor mud surface; and
- a planar base, said planar base having a top side and a bottom side, said vertical shaft being attached to and perpendicular to the planar base; and
- a clamping assembly attached to the bottom of the planar base, said clamping assembly being configured to controllably grip a drain and position the vertical shaft concentric with the drain, said clamping assembly comprising a pair of stationary supports and an adjustable support, said stationary supports being positioned to contact a periphery of a half of a drain and said adjustable support being positioned to controllably exert force against the periphery of an opposite half of the drain; and said method comprising attaching the device to a drain;

leveling the device;

spreading floor mud;

rotating the arm; and progressively lowering the elevation of the arm and repeating rotation of the arm to achieve a desired uniform inclined surface.

* * * * *